(12) United States Patent
Barbee et al.

(10) Patent No.: US 9,526,086 B1
(45) Date of Patent: Dec. 20, 2016

(54) APPLICATION DATA RATE LIMITING IN A WIRELESS COMMUNICATION DEVICE

(75) Inventors: Bryan Timothy Barbee, Olathe, KS (US); Clark Douglas Halferty, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1035 days.

(21) Appl. No.: 13/215,615

(22) Filed: Aug. 23, 2011

(51) Int. Cl.
| | | |
|---|---|---|
| H04W 4/00 | (2009.01) | |
| H04W 72/02 | (2009.01) | |
| H04W 52/26 | (2009.01) | |
| H04W 4/26 | (2009.01) | |
| H04W 72/00 | (2009.01) | |

(52) U.S. Cl.
CPC ............... *H04W 72/02* (2013.01); *H04W 4/26* (2013.01); *H04W 52/267* (2013.01); *H04W 72/005* (2013.01)

(58) Field of Classification Search
USPC .................................. 370/331, 329, 338, 252
See application file for complete search history.

(56) References Cited

U.S. PATENT DOCUMENTS

| | | | |
|---|---|---|---|
| 6,578,082 B1 | 6/2003 | Ho et al. | |
| 7,023,799 B2 | 4/2006 | Takase et al. | |
| 7,333,436 B2 | 2/2008 | Fukuda et al. | |
| 7,477,605 B2 | 1/2009 | Huo | |
| 8,010,692 B1 * | 8/2011 | Shanson et al. | 709/231 |
| 2008/0268828 A1 * | 10/2008 | Nagaraja | 455/419 |
| 2009/0103434 A1 * | 4/2009 | Madsen et al. | 370/232 |
| 2009/0154902 A1 * | 6/2009 | Ichinose | 386/124 |
| 2010/0172253 A1 * | 7/2010 | Morita | 370/252 |
| 2010/0172260 A1 * | 7/2010 | Kwan et al. | 370/252 |
| 2011/0276442 A1 * | 11/2011 | Momtahan et al. | 705/30 |
| 2012/0094658 A1 * | 4/2012 | Macias et al. | 455/426.1 |
| 2012/0265867 A1 * | 10/2012 | Boucher et al. | 709/223 |
| 2013/0012161 A1 * | 1/2013 | Rubin et al. | 455/406 |

* cited by examiner

*Primary Examiner* — Zewdu A Beyen (57) ABSTRACT

A wireless communication device comprises a wireless communication transceiver and a processing system. The wireless communication transceiver is configured to receive data via a communication network and to receive a data restriction message that instructs the wireless communication device to limit a rate at which the data is provided to a user. The processing system is configured to determine individual amounts of the data associated with a plurality of applications of the wireless communication device, identify an application of the plurality of applications associated with an individual amount of the data that meets a criterion, and limit a delivery rate at which application data associated with the application is provided to the user based on the data restriction message.

20 Claims, 7 Drawing Sheets

APPLICATION DATA RATE LIMITING IN A WIRELESS COMMUNICATION DEVICE

TECHNICAL BACKGROUND

The use of wireless communication devices to send and receive information has become increasingly prominent. Typically, an operating system is installed on a wireless communication device to manage and coordinate the various functions that the device performs. In addition to the operating system, various applications are often available for the wireless communication device that are designed to execute on the operating system. Some examples of applications available for wireless communication devices include news, sports, and weather applets, games, media players, business tools, educational software, social networking applications, internet browsers, and many more. However, in operation, such applications often request large amounts of data, placing a high demand on network bandwidth and other resources.

To address this demand, communication service providers often apply data rate-limiting policies to wireless communication devices for data usage exceeding a reasonable amount as deemed by the service provider. Typically, rate-limiting is effectuated by adjusting parameters within the home agent associated with the problem device in order to reduce the amount of data carried by radio frequency (RF) timeslots destined for the rate-limited device. For example, if the RF timeslots have a capacity of 2.4 megabits per second, the home agent might limit the slot occupancy to only 256 kilobits per second to effectuate rate-limiting on a particular device. However, such rate-limiting techniques result in inefficient use of available slot occupancy and waste power cycles transmitting partially-filled slots.

Overview

A wireless communication device comprises a wireless communication transceiver and a processing system. The wireless communication transceiver is configured to receive data via a communication network and to receive a data restriction message that instructs the wireless communication device to limit a rate at which the data is provided to a user. The processing system is configured to determine individual amounts of the data associated with a plurality of applications of the wireless communication device, identify an application of the plurality of applications associated with an individual amount of the data that meets a criterion, and limit a delivery rate at which application data associated with the application is provided to the user based on the data restriction message.

A computer-readable medium having instructions stored thereon for operating a wireless communication device is disclosed herein. The instructions, when executed by the wireless communication device, direct the wireless communication device to receive data via a communication network, and receive a data restriction message that instructs the wireless communication device to limit a rate at which the data is provided to a user. The instructions further direct the wireless communication device to determine individual amounts of the data associated with a plurality of applications of the wireless communication device, and identify an application of the plurality of applications associated with an individual amount of the data that meets a criterion. The instructions further direct the wireless communication device to limit a delivery rate at which application data associated with the application is provided to the user based on the data restriction message.

A communication system comprises a wireless communication device and a data usage management system. The wireless communication device is configured to receive data via a communication network. The data usage management system is configured to monitor data bandwidth usage of the wireless communication device and transmit a data restriction message for delivery to the wireless communication device when the data bandwidth usage exceeds a usage threshold, wherein the data restriction message instructs the wireless communication device to limit a rate at which the data is provided to a user. The wireless communication device is configured to receive the data restriction message and determine individual amounts of the data associated with a plurality of applications of the wireless communication device. Further, the wireless communication device is configured to identify an application of the plurality of applications associated with an individual amount of the data that meets a criterion, and limit a delivery rate at which application data associated with the application is provided to the user based on the data restriction message.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
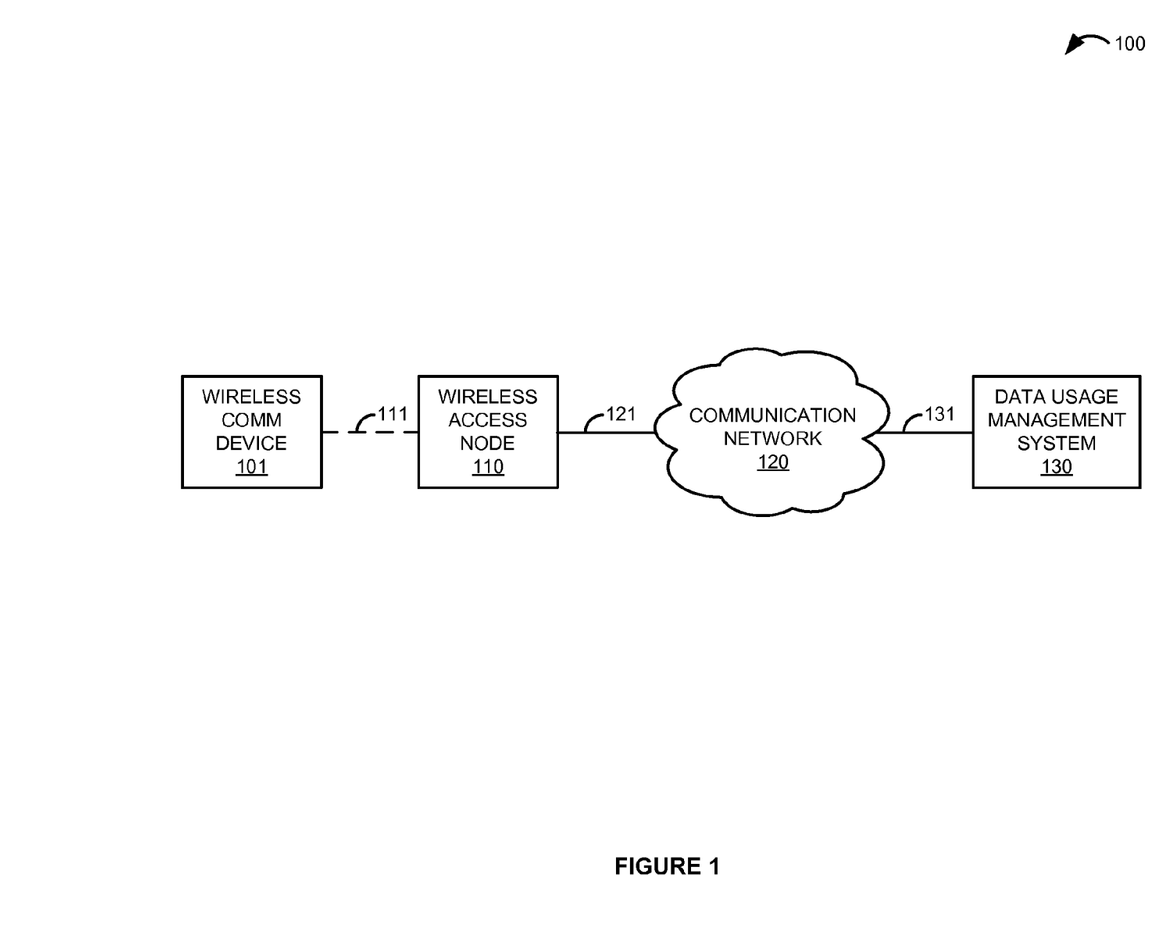
FIG. 1 is a block diagram that illustrates a communication system.

FIG. 1 is a block diagram that illustrates communication system 100. Communication system 100 includes wireless communication device 101, wireless access node 110, communication network 120, and data usage management system 130. Wireless communication device 101 and wireless access node 110 are in communication over wireless communication link 111. Wireless access node 110 and communication network 120 are in communication over communication link 121. Communication network 120 and data usage management system 130 communicate over communication link 131.

Figure 2:
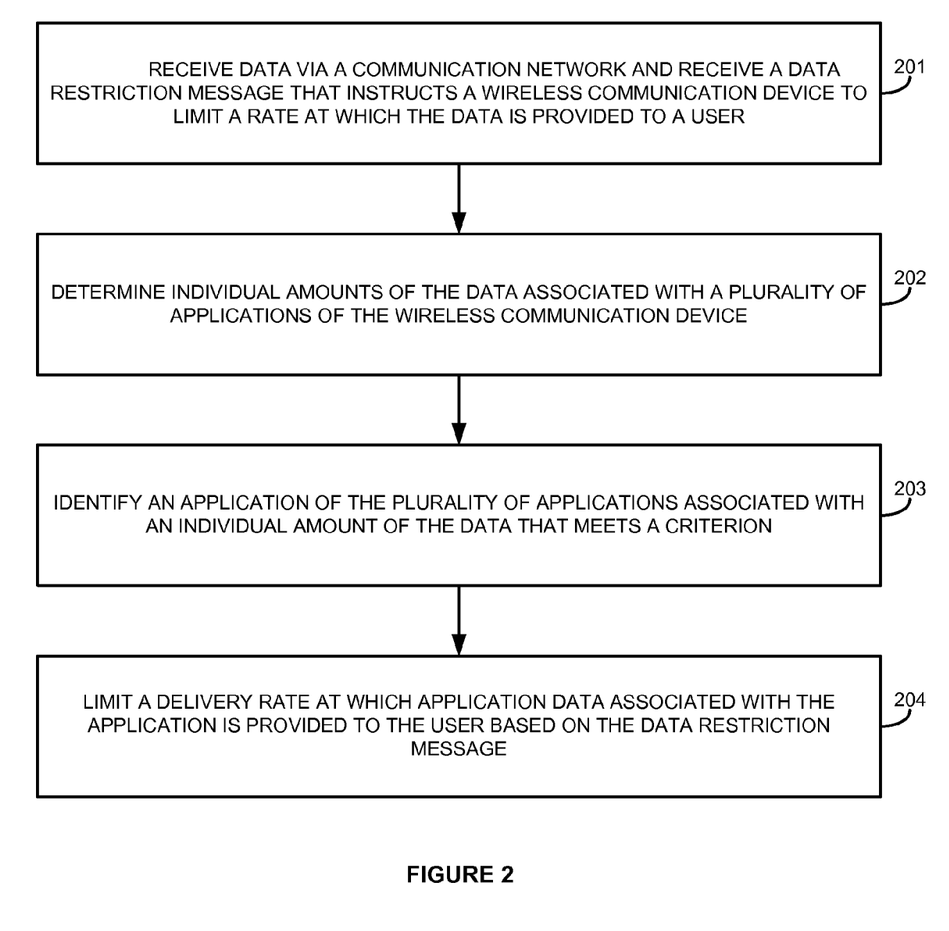
FIG. 2 is a flow diagram that illustrates an operation of the communication system.

FIG. 2 is a flow diagram that illustrates an operation of communication system 100. The steps of the operation are indicated below parenthetically. Initially, wireless communication device 101 receives data via communication network 120 (201). The data received by wireless communication device 101 could comprise any information, and is typically delivered in the form of data packets. In some examples, the data could be received by wireless communication device 101 in response to a request for the data initiated by a user, an operating system, an application, or some other process executing on device 101. Additionally or alternatively, the data transfer could be initiated by some other communication system or device that is in communication with wireless communication device 101 via communication network 120.

Wireless communication device 101 also receives a data restriction message that instructs wireless communication device 101 to limit a rate at which the data is provided to a user (201). Typically, wireless communication device 101 receives the data restriction message from communication network 120 or some communication system associated with network 120, such as data usage management system 130. For example, data usage management system 130 could monitor data bandwidth usage of wireless communication device 101 and transmit the data restriction message for delivery to wireless communication device 101 when the data bandwidth usage exceeds a usage threshold. In some examples, the data restriction message could indicate a target rate at which to provide the data to the user, which would typically be a slower rate than the rate that wireless communication device 101 receives the data via communication network 120.

In response to the data restriction message, wireless communication device 101 determines individual amounts of the data associated with a plurality of applications of wireless communication device 101 (202). The applications typically comprise third-party executable processing instructions configured to operate within an operating system of wireless communication device 101, but the applications could be associated with the operating system and/or comprise the operating system itself in some examples. For example, the applications could include web browsers, streaming media applications, gaming applications, television applications, or any other software application installed on wireless communication device 101.

Wireless communication device 101 could determine the individual amounts of the data associated with each of the applications in several ways. In some examples, wireless communication device 101 could determine which applications are presently executing on wireless communication device 101 during a communication session and then determine percentages of data packets received in the data that are associated with each of the executing applications. For example, wireless communication device 101 could utilize source packet addresses, source and destination ports, media access control (MAC) addresses, protocols, application programming interface (API) objects, and other information to determine a distribution of packets received in the data for each of the applications of device 101 during the communication session. In some examples, wireless communication device 101 could additionally or alternatively determine the individual amounts of the data associated with the applications by analyzing historical bandwidth usage information for each of the applications. For example, wireless communication device 101 could continuously monitor data bandwidth usage for each application installed on device 101, and store the individual data usage information for each application in a memory system for use in determining the individual amounts of the data associated with the applications. Thus, in some examples, the individual amounts of the data associated with each of the applications could include historical data usage in addition to current/real-time data usage during a communication session. Other techniques to determine individual amounts of data received via communication network 120 that are associated with each of the applications executing on wireless communication device 101 are also possible and within the scope of the present disclosure.

Wireless communication device 101 then identifies an application of the plurality of applications associated with an individual amount of the data that meets a criterion (203). Typically, after determining the individual amounts of the data associated with each of the applications, wireless communication device 101 processes each of the individual amounts with a criterion to identify the application associated with the individual amount of the data that meets the criterion. In some examples, the criterion could be predetermined, received in the data restriction message, or determined dynamically by wireless communication device 101, such as calculated based on a percentage of total data usage consumed by wireless communication device 101.

There are many ways in which wireless communication device 101 could identify the application associated with the individual amount of the data that meets the criterion. For example, to identify the application associated with the individual amount of the data that meets the criterion, wireless communication device 101 could determine that the individual amount of the data associated with the application exceeds a threshold. In another example, wireless communication device 101 could identify the application associated with the individual amount of the data that meets the criterion by determining that the individual amount of the data associated with the application has a greatest value of the individual amounts of the data associated with the plurality of applications. For example, by comparing the individual amounts of the data associated with each of the applications, wireless communication device 101 can identify the application or applications responsible for the greatest amount of data usage. Additionally, in some examples wireless communication device 101 could also refer to a list of predetermined applications that are typically associated with high levels of data usage, and could factor in this information when identifying the application associated with the individual amount of the data that meets the criterion.

Typically, the criterion is described in such a way that the application or applications with the heaviest data usage of all the applications will meet the criterion. However, in some examples, wireless communication device 101 could store locations of device 101 when data usage occurs for each of the applications, along with time periods of such usage per application, and could further utilize this information in dynamically determining the criterion and/or identifying applications associated with individual amounts of the data that meet the criterion. For example, the criterion could comprise a data usage score threshold, and wireless communication device 101 could determine data usage scores for each of the applications by applying more weight to data usage that occurs in predetermined high traffic locations and/or during predetermined high volume time periods. Therefore, the application with the heaviest data usage may not meet the criterion in this case if that usage primarily occurred at relatively lower-weighted locations and time periods.

After identifying the application associated with the individual amount of the data that meets the criterion, wireless communication device 101 limits a delivery rate at which application data associated with the application is provided to the user based on the data restriction message (204). The application data associated with the application could comprise data packets that are currently being received by wireless communication device 101 on behalf of the application and/or data packets that will be received by device 101 for the application in the future. Typically, wireless communication device 101 limits the delivery rate at which the application data associated with the application is provided to the user by providing the application data to the application at a slower rate than device 101 is receiving the application data from communication network 120. For example, wireless communication device 101 could limit the delivery rate at which the application data associated with the application is provided to the user by caching the application data in a rate-limited buffer prior to providing the application data to the user.

Advantageously, wireless communication device 101 can identify a particular application or applications having data bandwidth usage that meets a criterion, such as threshold values, application ranking by data usage, and other types of criteria. Wireless communication device 101 then internally limits the delivery rate of data associated with the identified application, while continuing to receive data via communication network 120 at the typical rate and capacity of communication network 120. However, because wireless communication device 101 provides the application data to the application at the limited delivery rate, communication network 120 can send the data to wireless communication device 101 less frequently, thereby reducing the burden on communication network 120 by freeing up bandwidth and other network resources.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 120 comprises the core network of a wireless communication service provider, and could include routers, gateways, telecommunication switches, servers, processing systems, or other communication equipment and systems for providing communication and data services. Communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 120 may be configured to communicate over metallic, wireless, or optical links—including combinations thereof. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to many wireless communication devices across a large geographic region.

Data usage management system 130 comprises a processing system and communication transceiver. Data usage management system 130 may also include other components such as a router, server, data storage system, and power supply. Data usage management system 130 may reside in a single device or may be distributed across multiple devices. Data usage management system 130 may be a discrete system or may be integrated within other systems—including other systems within communication system 100. In some examples, data usage management system 130 could comprise a home agent, packet data serving node (PDSN), network switch, mobile switching center, router, switching system, packet gateway, network gateway system, Internet access node, application server, service node, firewall, or some other communication system—including combinations thereof.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121 and 131 use metal, air, space, optical fiber such as glass or plastic, or some other material as the transport medium—including combinations thereof. Communication links 121 and 131 could use various communication protocols, such as TDM, IP, Ethernet, telephony, optical networking, hybrid fiber coax (HFC), communication signaling, wireless protocols, or some other communication format—including combinations thereof. Communication links 121 and 131 may be direct links or could include intermediate networks, systems, or devices.

Figure 3:
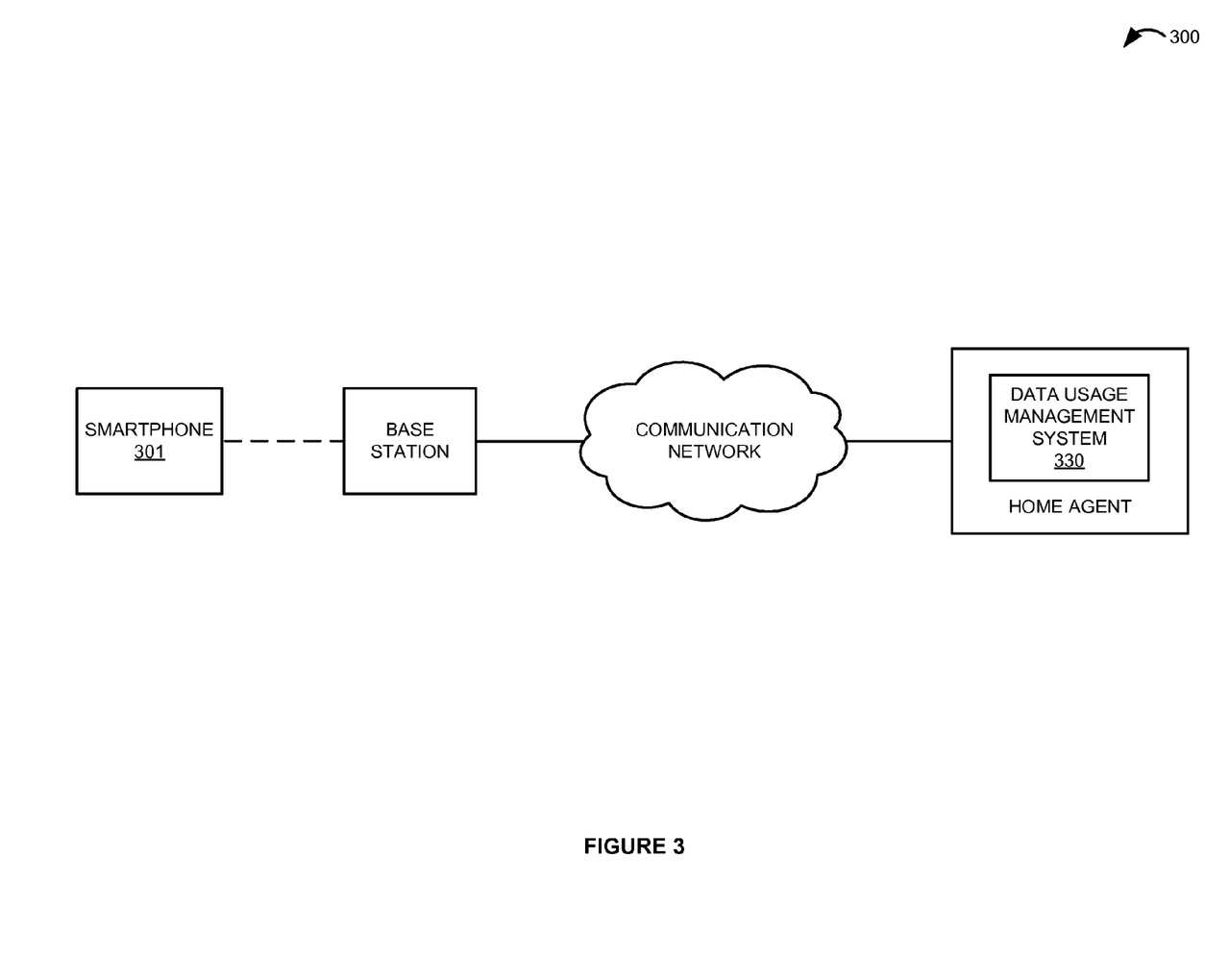
FIG. 3 is a block diagram that illustrates a communication system in an exemplary embodiment.

FIG. 3 is a block diagram that illustrates communication system 300 in an exemplary embodiment. Communication system 300 includes smartphone 301 and data usage management system 330. Smartphone 301 provides an example of wireless communication device 101, although device 101 may use alternative configurations. In the example of communication system 300, data usage management system 330 is shown as part of the home agent for smartphone 301. However, in other examples, data usage management system 330 could be included in a PDSN or some other service node or communication system, including the base station.

Figure 4:
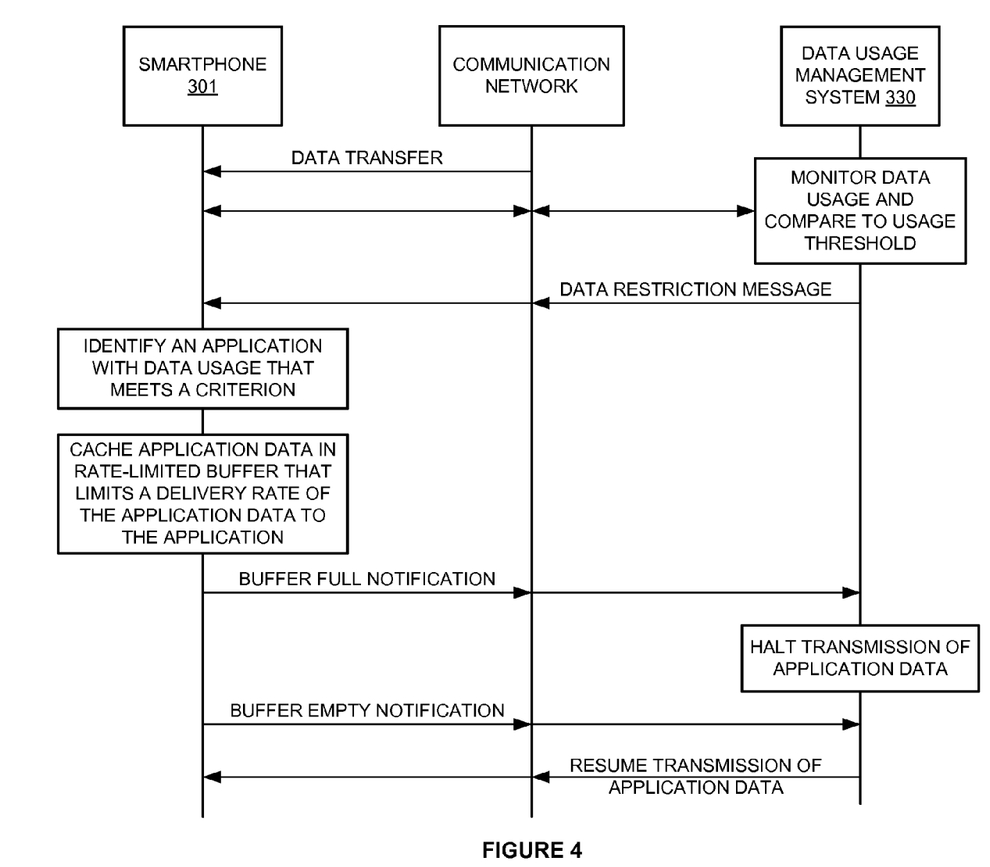
FIG. 4 is a sequence diagram that illustrates an operation of a communication system in an exemplary embodiment.

FIG. 4 is a sequence diagram that illustrates an operation of communication system 300 in an exemplary embodiment. Initially, smartphone 301 wirelessly receives data transferred over a communication network. The data received by smartphone 301 is typically associated with several applications executing on smartphone 301 that request the data, and could include data for operating system processes, data requested by the user via a web browser, or data for any other application. For example, the data could include streaming media, software updates, email messages, web content, and any other type of data, including files for installing new software applications.

Data usage management system 330 monitors the data usage of smartphone 301 and compares the data usage to a usage threshold. Typically, data usage management system 330 monitors the data usage of smartphone 301 during a predefined period, such as during a particular month or billing cycle. The usage threshold is typically a predetermined amount of data usage allowed for a single device such as smartphone 301 that is considered reasonable by the communication network for consumption during the time period being monitored. For example, the usage threshold could be set to five gigabytes of data throughput during a billing cycle. To monitor the data usage of smartphone 301, data usage management system 330 typically sums data packets having a destination IP address assigned to smartphone 301. However, although FIG. 4 shows data being transferred to smartphone 301 via the communication network, one of skill in the art will understand that smartphone 301 could also utilize an uplink communication channel to transmit data to other communication systems via the communication network, and this uplink data transmitted by smartphone 301 could be included in the data usage monitoring performed by data usage management system 330 and compared to the usage threshold in some examples.

If the data usage of smartphone 301 exceeds the usage threshold during the monitored time period, data usage management system 330 transfers a data restriction message for delivery to smartphone 301. The data restriction message directs smartphone 301 to limit a rate that the data is provided to the user, and could include a target rate for providing the data to the user. In this example, the data restriction message also indicates a time period during which the restriction is in effect, which is for the remaining duration of the current billing cycle in this instance.

In response to the data restriction message, smartphone 301 identifies at least one application with data usage that meets a criterion. To make this determination, smartphone 301 maintains data logs of historical data usage for each application of smartphone 301, and processes the historical data usage with the criterion to determine an application that meets the criterion. In this example, the criterion directs smartphone 301 to identify the application with the greatest amount of data usage during the time period identified in the data restriction message, which smartphone 301 identifies as a streaming video application in this case. Of course, depending on the criterion utilized, in some examples smartphone 301 could determine that multiple applications have data usage that meets the criterion. Further, smartphone 301 could apply several criteria to identify these applications.

Upon identifying the application, smartphone 301 caches application data associated with the application in a rate-limited buffer that limits a delivery rate of the application data to the application. In order to cache the application data, in this example smartphone 301 reads the headers of incoming data packets and caches those packets having IP addresses, ports, and/or other information that can be associated with the application in the rate-limited buffer instead of providing the packets directly to the application. The packets are then provided to the application from the rate-limited buffer at a slower rate than they are received by smartphone 301 via the communication network. For example, if the application data for the application is provided by the communication network to smartphone 301 at a rate of 2.4 megabits per second, smartphone 301 may trickle the application data out of the rate-limited buffer to the application at a rate of only 256 kilobits per second.

Although not shown in FIG. 4, upon limiting the delivery of the application data, smartphone 301 could display a notification to the user that the delivery rate of the application data is limited for the application. The user notification could also indicate time periods during which the delivery rate limitation is in effect for the application, such as weekdays and high-traffic time periods, until the end of a month or billing cycle, and other types of restrictions on data usage for the application. Additionally, the user notification could indicate alternative time periods during which performance will improve for the application, such as weekends or other low-traffic time periods, and smartphone 301 could remove the restrictions on data usage for the application during these time periods.

As smartphone 301 is caching the application data for the application, which are streaming video packets for the identified streaming video application in this example, smartphone 301 also monitors a capacity of the rate-limited buffer and compares the capacity to threshold values, which could be predetermined, based on a percentage of the total capacity of the buffer, or based on some other threshold considerations. Thus, when the capacity of the rate-limited buffer exceeds a maximum threshold, smartphone 301 transmits a buffer full notification for delivery to data usage management system 330. Data usage management system 330 then halts transmission of the application data associated with the application in response to receiving the buffer full notification. The buffer full notification could include attributes of the packets associated with the application such as IP addresses, ports, and the like which can be used by data usage management system 330 to identify which packets to stop transmitting. Data usage management system 330 could then buffer these packets at the home agent until instructed to resume transmission.

Smartphone 301 uses the rate-limited buffer to slowly deliver, or "trickle" the application data to the application. In some examples, the delivery rate at which smartphone 301 provides the application data to the application could be determined dynamically. For example, the data restriction message received by smartphone 301 from data usage management system 330 could indicate a target rate at which to provide the data to the user, and smartphone 301 could determine the delivery rate for the application data based on the target rate included in the data restriction message. In some examples, the target rate could comprise the actual delivery rate that smartphone 301 should use for providing the application data to the application. In other examples, the target rate could comprise an overall target rate for all data transmitted to smartphone 301 via the communication network, and smartphone 301 could calculate the delivery rate for the application data based on rates of data received for other applications that are not being limited to arrive at the overall target rate for all data sent to smartphone 301 as indicated in the data restriction message. Other rate calculations are also possible, including the use of predetermined delivery rates stored within smartphone 301.

When the capacity of the rate-limited buffer has been depleted and falls below a minimum threshold, smartphone 301 transmits a buffer empty notification for delivery to data usage management system 330. Responsive to the buffer empty notification, data usage management system 330 resumes transmission of the application data for delivery to smartphone 301, which in this example is accomplished by directing the home agent to start transferring packets associated with the application that were being buffered at the home agent in response to the buffer full notification received earlier. Upon receiving the application data, smartphone 301 again caches the application data in the rate-limited buffer, trickles the application data to the application at a slower delivery rate than the rate the data is received from the home agent, and informs data usage management system 330 when the buffer has been filled again by transmitting another buffer full notification. The rate-limited buffer management process described above is thus repeated until all of the application data has been transferred to smartphone 301 and/or until the data rate limitations for the application have expired.

Advantageously, by implementing data rate limiting per application at smartphone 301 instead of throttling back data packets for smartphone 301 at the home agent, smartphone 301 can intelligently determine which application or applications are causing the excessive data usage that triggered data usage management system 330 to transfer the data restriction message. By having smartphone 301 cache the application data in the rate-limited buffer and slowly trickle it to the problem applications, the home agent serving smartphone 301 can periodically pause the transmission of packets associated with the applications having high data usage, thereby reducing strain on the network and freeing up network capacity for other users. The operation of managing the rate-limited buffer and the associated messaging between smartphone 301 and data usage management system 330 will now be described with respect to the trend chart shown in FIG. 5.

Figure 5:
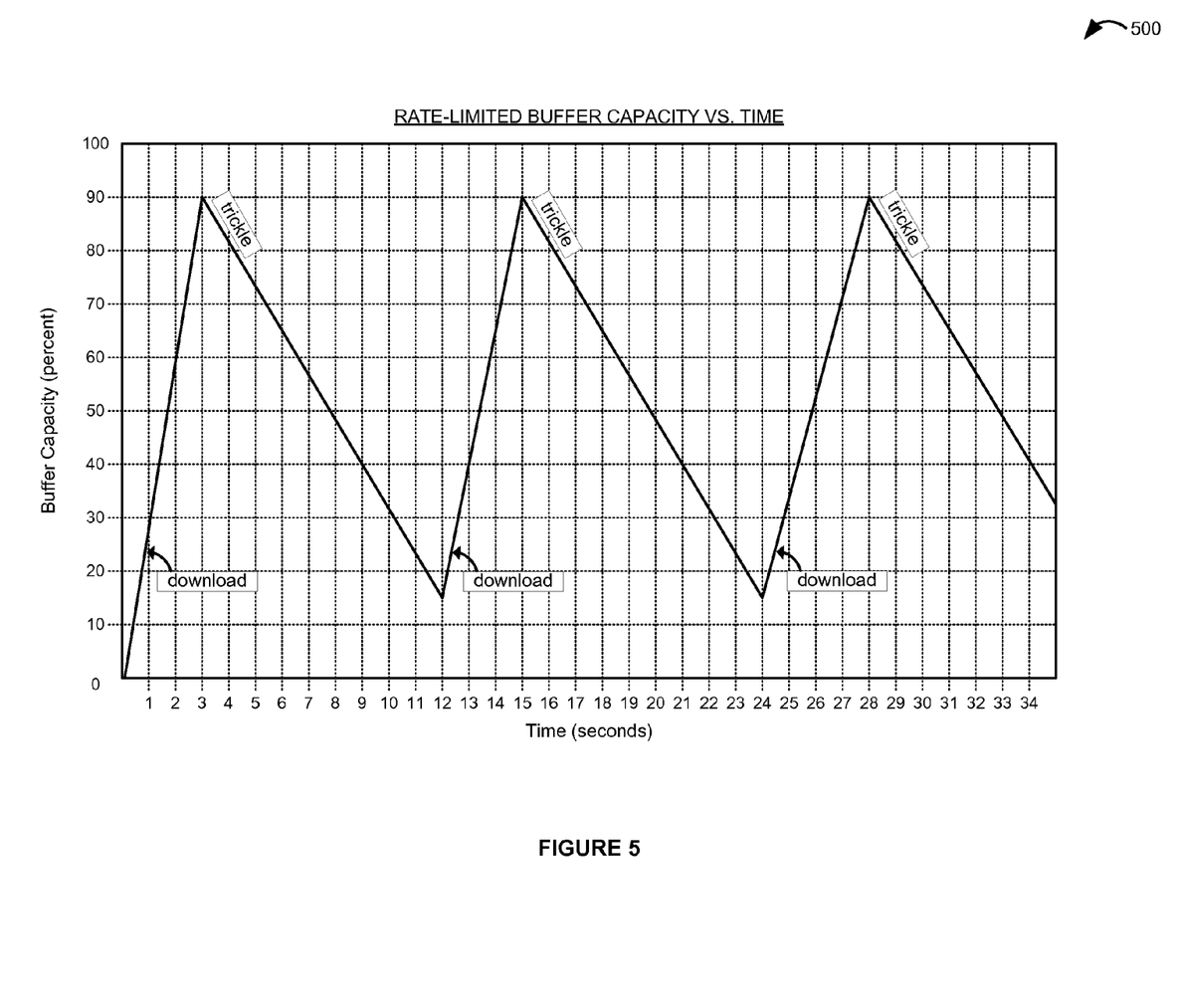
FIG. 5 is a trend diagram that illustrates buffer capacity versus time in an exemplary embodiment.

FIG. 5 is a trend diagram 500 that illustrates buffer capacity versus time in an exemplary embodiment. In diagram 500, the buffer capacity in terms of percentage is shown along the vertical "Y" axis, while the time in seconds extends along the horizontal "X" axis. Each of the upward-climbing lines appearing on diagram 500 are marked "download", and represent periods of time when smartphone 301 is receiving data from the home agent via the communication network and filling the rate-limited buffer. Alternatively, each of the downward-sloping lines are marked "trickle", and represent periods of time when smartphone 301 has informed data usage management system 330 that the rate-limited buffer is full, resulting in data usage management system 330 halting the transmission of data being sent to smartphone 301, and smartphone 301 slowly delivers the data that has accumulated in the rate-limited buffer to the application or applications requesting the data. However, note that although trend diagram 500 appears to show that the data is trickled out of the rate-limited buffer only once the buffer is full, in practice the data would be slowly trickled out of the rate-limited buffer as soon as it is available, so that the user effectively experiences a constant and uninterrupted trickle of data to the application or applications subject to rate limiting.

At each of the peaks and valleys appearing on the trend, smartphone 301 transmits a buffer full notification or a buffer empty notification, respectively, for delivery to data usage management system 330. Thus, in this example, smartphone 301 is configured to transmit a buffer full notification to data usage management system 330 when the rate-limited buffer reaches 90% of total capacity, and transmits a buffer empty notification when the rate-limited buffer falls to 15% of total capacity. As shown in FIG. 5, smartphone 301 downloads the data into the rate-limited buffer in bursts of three seconds, but trickles the data to the applications over time periods of nine seconds. Thus, the rate-limited buffer in this example limits the delivery rate of the data to the applications to a rate that is roughly three times slower than the rate at which the data is received from the home agent over the communication network. Advantageously, during each of the "tickle" downward-sloping portions of the trend, the home agent can halt the transfer of data associated with rate-limited applications. Further, one of skill in the art will understand that the rate-limited buffer described herein is not limited to use with one or more applications installed on smartphone 301, but could be utilized by smartphone 301 to buffer all data received and/or transferred by smartphone 301 over the communication network.

Figure 6:
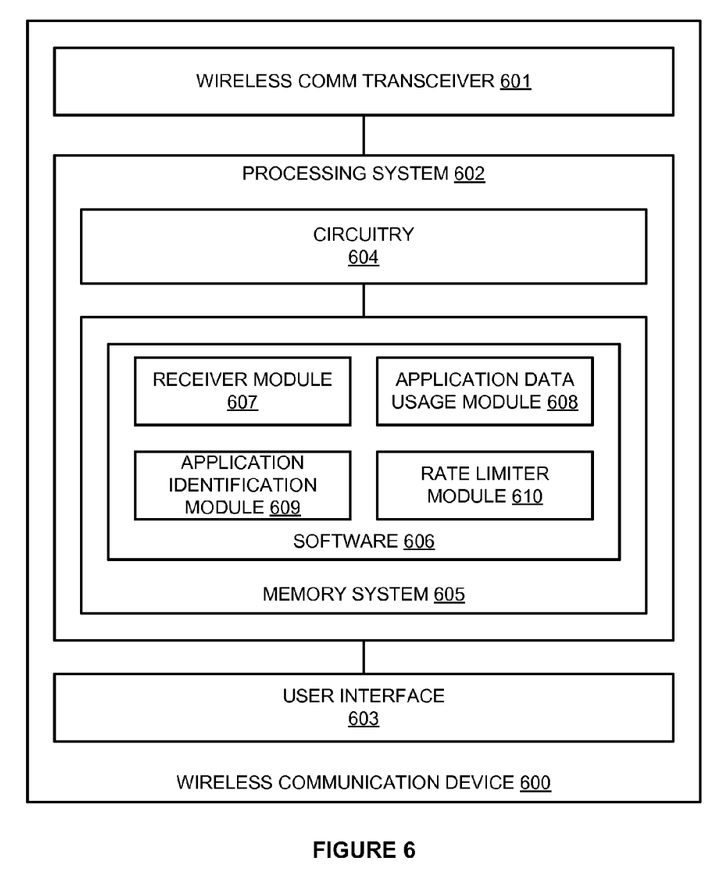
FIG. 6 is a block diagram that illustrates a wireless communication device.

FIG. 6 is a block diagram that illustrates wireless communication device 600. Wireless communication device 600 provides an example of wireless communication device 101, although device 101 could use alternative configurations. Wireless communication device 600 comprises wireless communication transceiver 601, processing system 602, and user interface 603. Processing system 602 is linked to wireless communication transceiver 601 and user interface 603. Processing system 602 includes processing circuitry 604 and memory system 605 that stores operating software 606. Operating software 606 comprises software modules 607-610. Wireless communication device 600 may include other well-known components such as a battery and enclosure that are not shown for clarity. Wireless communication device 600 may comprise a telephone, computer, e-book, mobile Internet appliance, media player, game console, wireless network interface card, or some other wireless communication apparatus—including combinations thereof.

Wireless communication transceiver 601 comprises RF communication circuitry and an antenna. The RF communication circuitry typically includes an amplifier, filter, RF modulator, and signal processing circuitry. Wireless communication transceiver 601 may also include a memory system, software, processing circuitry, or some other communication device. Wireless communication transceiver 601 may use various protocols, such as CDMA, GSM, UMTS, HSPA, EV-DO, EV-DO rev. A, 3GPP LTE, LTE Advanced, WiMAX, Wi-Fi, Bluetooth, Internet, telephony, or some other wireless communication format. Wireless communication transceiver 601 is configured to receive data via a communication network and to receive a data restriction message that instructs wireless communication device 600 to limit a rate at which the data is provided to a user.

User interface 603 comprises components that interact with a user to receive user inputs and to present media and/or information. User interface 603 may include a speaker, microphone, buttons, lights, display screen, touch screen, touch pad, scroll wheel, communication port, or some other user input/output apparatus—including combinations thereof. User interface 603 could be configured to display a notification to a user that a delivery rate of application data is limited for an application. User interface 603 may be omitted in some examples.

Processing circuitry 604 comprises microprocessor and other circuitry that retrieves and executes operating software 606 from memory system 605. Processing circuitry 604 may comprise a single device or could be distributed across multiple devices—including devices in different geographic areas. Processing circuitry 604 may be embedded in various types of equipment. Memory system 605 comprises a non-transitory computer readable storage medium, such as a disk drive, flash drive, data storage circuitry, or some other hardware memory apparatus. Memory system 605 may comprise a single device or could be distributed across multiple devices—including devices in different geographic areas. Memory system 605 may be embedded in various types of equipment. Processing circuitry 604 is typically mounted on a circuit board that may also hold memory system 605 and portions of wireless communication transceiver 601 and user interface 603. Operating software 606 comprises computer programs, firmware, or some other form of machine-readable processing instructions. Operating software 606 may include an operating system, utilities, drivers, network interfaces, applications, or some other type of software. In this example, operating software 606 comprises software modules 607-610, although software 606 could have alternative configurations in other examples.

When executed by processing circuitry 604, operating software 606 directs processing system 602 to operate wireless communication device 600 as described herein for wireless communication device 101. In particular, operating software 606 directs processing system 602 to direct wireless communication transceiver 601 to receive data via a communication network and to receive a data restriction message that instructs wireless communication device 600 to limit a rate at which the data is provided to a user. Further, operating software 606 directs processing system 602 to determine individual amounts of the data associated with a plurality of applications of wireless communication device 600. In addition, operating software 606 directs processing system 602 to identify an application of the plurality of applications associated with an individual amount of the data that meets a criterion. Operating software 606 also directs processing system 602 to limit a delivery rate at which application data associated with the application is provided to the user based on the data restriction message.

In this example, operating software 606 comprises a receiver software module 607 that receives data via a communication network and receives a data restriction message that instructs wireless communication device 600 to limit a rate at which the data is provided to a user. Additionally, operating software 606 comprises an application data usage software module 608 that determines individual amounts of the data associated with a plurality of applications of wireless communication device 600. Operating software 606 also comprises an application identification software module 609 that identifies an application of the plurality of applications associated with an individual amount of the data that meets a criterion. Finally, operating software 606 comprises a rate limiter software module 610 that limits a delivery rate at which application data associated with the application is provided to the user based on the data restriction message.

Figure 7:
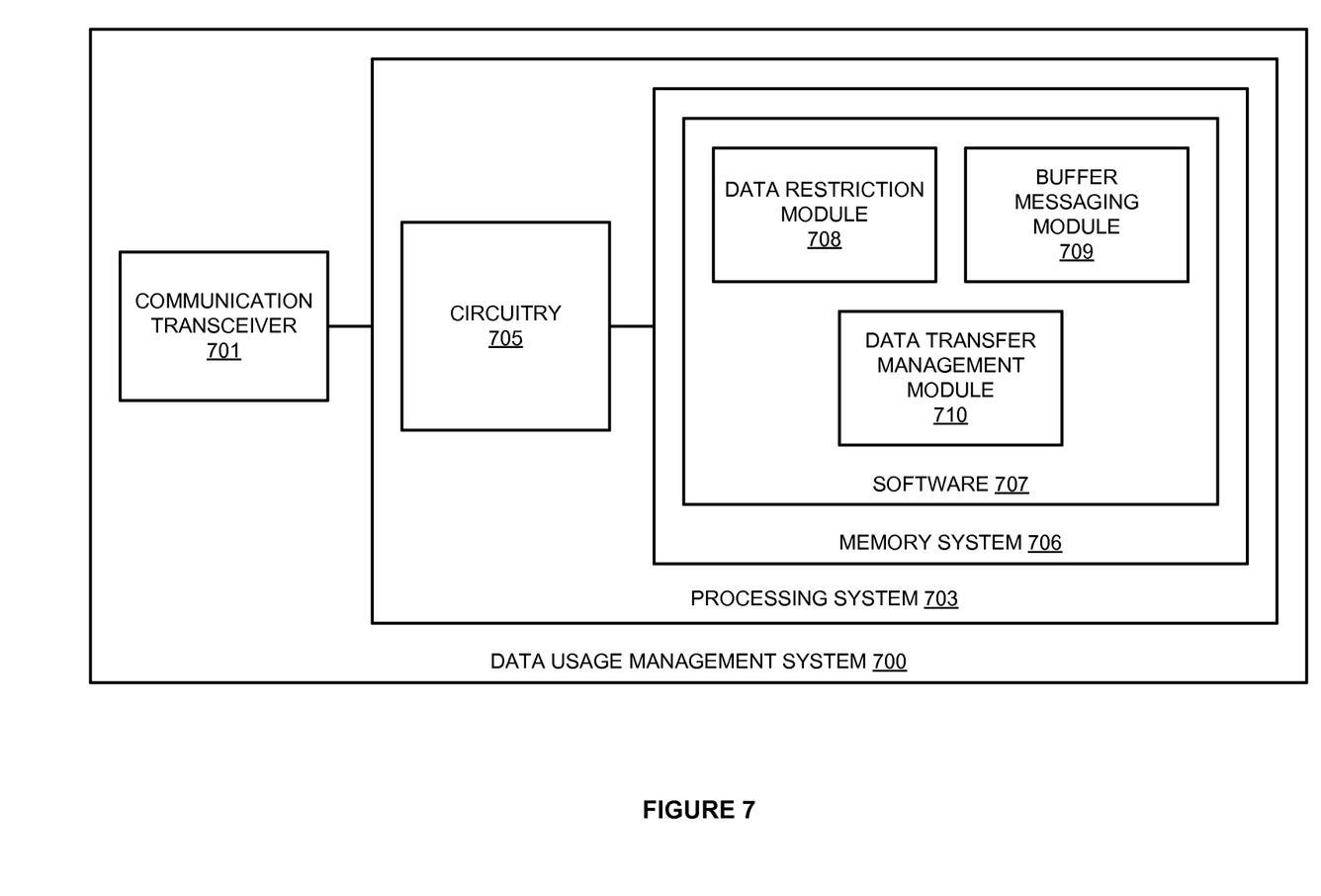
FIG. 7 is a block diagram that illustrates a data usage management system.

FIG. 7 is a block diagram that illustrates data usage management system 700. Data usage management system 700 provides an example of data usage management systems 130 and 330, although systems 130 and 330 may use alternative configurations. Data usage management system 700 comprises communication transceiver 701 and processing system 703. Processing system 703 is linked to communication transceiver 701. Processing system 703 includes processing circuitry 705 and memory system 706 that stores operating software 707. Operating software 707 comprises software modules 708-710.

Communication transceiver 701 comprises components that communicate over communication links, such as network cards, ports, RF transceivers, processing circuitry and software, or some other communication components. Communication transceiver 701 may be configured to communicate over metallic, wireless, or optical links. Communication transceiver 701 may be configured to use TDM, IP, Ethernet, optical networking, wireless protocols, communication signaling, or some other communication format—including combinations thereof. Communication transceiver 701 may be configured to transmit a data restriction message for delivery to a wireless communication device when data bandwidth usage exceeds a usage threshold. Further, communication transceiver 701 may be configured to receive a buffer full notification and a buffer empty notification transmitted from a wireless communication device.

Processing circuitry 705 comprises microprocessor and other circuitry that retrieves and executes operating software 707 from memory system 706. Processing circuitry 705 may comprise a single device or could be distributed across multiple devices—including devices in different geographic areas. Processing circuitry 705 may be embedded in various types of equipment. Memory system 706 comprises a non-transitory computer readable storage medium, such as a disk drive, flash drive, data storage circuitry, or some other hardware memory apparatus. Memory system 706 may comprise a single device or could be distributed across multiple devices—including devices in different geographic areas. Memory system 706 may be embedded in various types of equipment. Operating software 707 comprises computer programs, firmware, or some other form of machine-readable processing instructions. Operating software 707 may include an operating system, utilities, drivers, network interfaces, applications, or some other type of software. In this example, operating software 707 comprises software modules 708-710, although software 707 could have alternative configurations in other examples.

When executed by circuitry 705, operating software 707 directs processing system 703 to operate as described herein for data usage management systems 130 and 330. In particular, operating software 707 directs processing system 703 to monitor data bandwidth usage of a wireless communication device and direct communication transceiver 701 to transmit a data restriction message for delivery to the wireless communication device when the data bandwidth usage exceeds a usage threshold. Additionally, operating software 707 could direct processing system 703 to direct communication transceiver 710 to receive a buffer full notification and a buffer empty notification transmitted from the wireless communication device. Upon reception of these notifications, operating software 707 could direct processing system 703 to halt transmission of application data associated with an application of the wireless communication device in response to receiving the buffer full notification, and to resume transmission of the application data in response to receiving the buffer empty notification.

In this example, operating software 707 comprises a data restriction software module 708 that monitors data bandwidth usage of a wireless communication device and transmits a data restriction message for delivery to the wireless communication device when the data bandwidth usage exceeds a usage threshold. In addition, operating software 707 comprises a buffer messaging software module 709 that receives a buffer full notification and a buffer empty notification transmitted from the wireless communication device. Further, operating software 707 comprises a data transfer management software module 610 that halts transmission of application data associated with an application of the wireless communication device in response to receiving the buffer full notification, and resumes transmission of the application data in response to receiving the buffer empty notification.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication device comprising:
    a wireless communication transceiver configured to receive data via a communication network and to receive a data restriction message that instructs the wireless communication device to limit a rate at which the data is provided to a user; and
    a processing system comprising circuitry configured to determine individual amounts of the data associated with a plurality of applications of the wireless communication device, identify an application of the plurality of applications associated with an individual amount of the data that meets a criterion, and limit a delivery rate at which application data associated with the application is provided to the user based on the data restriction message.

2. The wireless communication device of claim 1 wherein the processing system configured to identify the application associated with the individual amount of the data that meets the criterion comprises the processing system configured to determine that the individual amount of the data associated with the application exceeds a threshold.

3. The wireless communication device of claim 1 wherein the processing system configured to identify the application associated with the individual amount of the data that meets the criterion comprises the processing system configured to determine that the individual amount of the data associated with the application has a greatest value of the individual amounts of the data associated with the plurality of applications.

4. The wireless communication device of claim 1 wherein the processing system configured to limit the delivery rate at which the application data associated with the application is provided to the user comprises the processing system configured to cache the application data in a rate-limited buffer prior to providing the application data to the user.

5. The wireless communication device of claim 4 wherein the processing system is configured to monitor a capacity of the rate-limited buffer and direct the wireless communication transceiver to transmit a buffer full notification for delivery to a data usage management system when the capacity of the rate-limited buffer exceeds a maximum threshold and transmit a buffer empty notification for delivery to the data usage management system when the capacity of the rate-limited buffer falls below a minimum threshold.

6. The wireless communication device of claim 5 wherein the data usage management system halts transmission of the application data associated with the application in response to receiving the buffer full notification and resumes transmission of the application data in response to receiving the buffer empty notification.

7. The wireless communication device of claim 1 wherein the processing system is configured to direct a user interface to display a notification to the user that the delivery rate of the application data is limited for the application.

8. The wireless communication device of claim 1 wherein the data restriction message indicates a target rate at which to provide the data to the user.

9. The wireless communication device of claim 1 wherein the processing system configured to determine the individual amounts of the data associated with the plurality of applications comprises the processing system configured to analyze historical bandwidth usage information for each of the applications.

10. A non-transitory computer-readable medium having instructions stored thereon for operating a wireless communication device, wherein the instructions, when executed by the wireless communication device, direct the wireless communication device to:
    receive data via a communication network;
    receive a data restriction message that instructs the wireless communication device to limit a rate at which the data is provided to a user;
    determine individual amounts of the data associated with a plurality of applications of the wireless communication device;
    identify an application of the plurality of applications associated with an individual amount of the data that meets a criterion; and
    limit a delivery rate at which application data associated with the application is provided to the user based on the data restriction message.

11. The non-transitory computer-readable medium of claim 10 wherein the instructions direct the wireless communication device to identify the application associated with the individual amount of the data that meets the criterion by directing the wireless communication device to determine that the individual amount of the data associated with the application exceeds a threshold.

12. The non-transitory computer-readable medium of claim 10 wherein the instructions direct the wireless communication device to identify the application associated with the individual amount of the data that meets the criterion by directing the wireless communication device to determine that the individual amount of the data associated with the application has a greatest value of the individual amounts of the data associated with the plurality of applications.

13. The non-transitory computer-readable medium of claim 10 wherein the instructions direct the wireless communication device to limit the delivery rate at which the application data associated with the application is provided to the user by directing the wireless communication device to cache the application data in a rate-limited buffer prior to providing the application data to the user.

14. The non-transitory computer-readable medium of claim 13 wherein the instructions direct the wireless communication device to monitor a capacity of the rate-limited buffer, transmit a buffer full notification for delivery to a data usage management system when the capacity of the rate-limited buffer exceeds a maximum threshold, and transmit a buffer empty notification for delivery to the data usage management system when the capacity of the rate-limited buffer falls below a minimum threshold.

15. The non-transitory computer-readable medium of claim 14 wherein the data usage management system halts transmission of the application data associated with the application in response to receiving the buffer full notification and resumes transmission of the application data in response to receiving the buffer empty notification.

16. The non-transitory computer-readable medium of claim 10 wherein the instructions direct the wireless communication device to display a notification to the user that the delivery rate of the application data is limited for the application.

17. The non-transitory computer-readable medium of claim 10 wherein the data restriction message indicates a target rate at which to provide the data to the user.

18. The non-transitory computer-readable medium of claim 10 wherein the instructions direct the wireless communication device to determine the individual amounts of the data associated with the plurality of applications by directing the wireless communication device to analyze historical bandwidth usage information for each of the applications.

19. A communication system comprising:
a wireless communication device configured to receive data via a communication network; and
a data usage management system comprising circuitry configured to monitor data bandwidth usage of the wireless communication device and transmit a data restriction message for delivery to the wireless communication device when the data bandwidth usage exceeds a usage threshold, wherein the data restriction message instructs the wireless communication device to limit a rate at which the data is provided to a user;
the wireless communication device configured to receive the data restriction message, determine individual amounts of the data associated with a plurality of applications of the wireless communication device, identify an application of the plurality of applications associated with an individual amount of the data that meets a criterion, and limit a delivery rate at which application data associated with the application is provided to the user based on the data restriction message.

20. The communication system of claim 19 wherein the wireless communication device configured to limit the delivery rate at which the application data associated with the application is provided to the user comprises the processing system configured to cache the application data in a rate-limited buffer prior to providing the application data to the user;
the wireless communication device further configured to monitor a capacity of the rate-limited buffer, transmit a buffer full notification for delivery to the data usage management system when the capacity of the rate-limited buffer exceeds a maximum threshold, and transmit a buffer empty notification for delivery to the data usage management system when the capacity of the rate-limited buffer falls below a minimum threshold; and
the data usage management system configured to halt transmission of the application data associated with the application in response to receiving the buffer full notification and resume transmission of the application data in response to receiving the buffer empty notification.

* * * * *